Dec. 5, 1950 W. E. CLARK 2,532,892
APERTURE METER
Filed Oct. 11, 1949

INVENTOR.
William E. Clark,
BY Victor J. Evans & Co.
ATTORNEYS

Patented Dec. 5, 1950

2,532,892

UNITED STATES PATENT OFFICE 2,532,892

APERTURE METER

William Eugene Clark, Arkansas City, Kans.

Application October 11, 1949, Serial No. 120,683

1 Claim. (Cl. 235—64.7)

This invention relates to photographic equipment, and more particularly to a mechanical device for computing camera lens aperture when the other factors or variables are known.

The object of the invention is to provide a device for computing the value of the required lens aperture when the film speed, shutter speed and light intensity are known, or conversely, the device can be used for determining the required value of any of these four variables when the other three are known.

Another object of the invention is to provide a computing device which includes a plurality of coacting, movable, calibrated scales which may be arranged as rings, discs or in the form of a slide rule, and wherein certain of these scales are adapted to be mechanically or operatively connected to the camera shutter adjustment and to the aperture adjustment whereby upon proper setting of the scale, the shutter speed and aperture will be automatically adjusted to their correct positions.

A further object of the invention is to provide a computing device which is adapted to be readily attached to ordinary cameras, the computing device being simple and inexpensive to manufacture.

Other objects and advantages will be apparent during the course of the following description.

In the accompanying drawings forming a part of this application, and in which like numerals are used to designate like parts throughout the same:

Figure 1:
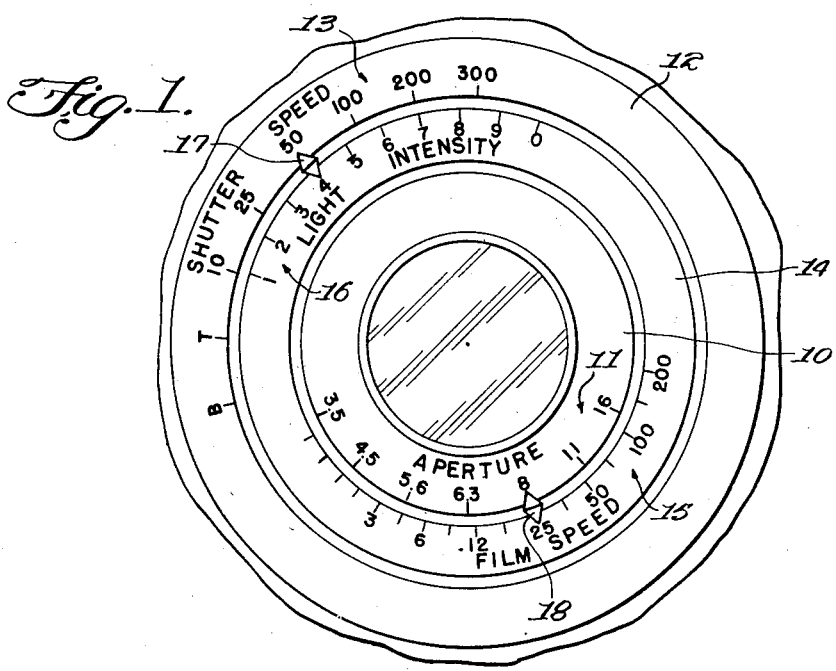
Figure 1 is an elevational view showing one form of the computing device.

Referring in detail to Figure 1 of the drawings, the numeral 10 designates a first ring which has a scale 11 of calibrated values of lens aperture thereon. Arranged in spaced concentric relation about the ring 10 is a ring 12, and the ring 12 is provided with a scale 13 which includes calibrated values of shutter speed.

Movably mounted between the rings 10 and 12 is a ring 14. The ring 14 is provided with a pair of scales thereon. Thus, the ring 14 includes a scale 15 of calibrated film speed values, and the ring 14 also includes a scale 16 of calibrated light intensity values.

A pointer 17 is movably mounted between the rings 12 and 14, and a second pointer 18 is movably mounted between the rings 10 and 14.

In using the device of Figure 1, the required lens aperture of the camera can be determined, when the value of the shutter speed, light intensity and film speed are known. Thus, assuming that the shutter speed is 1/50 of a second, the light intensity is 4, and the film speed is 25. Then, the pointer 17 is moved until it coincides with the number 50 on the scale 13; next, the ring 14 is rotated until the number 4 on the light-intensity scale coincides with the pointer 17. Then, the pointer 18 is moved so that one of its ends coincides with the number 25 on the film-speed scale 13 and then the other end of the pointer 18 will coincide with the number 8 on the scale 11, and the number 8 is the required value of the lens aperture.

Figure 2:
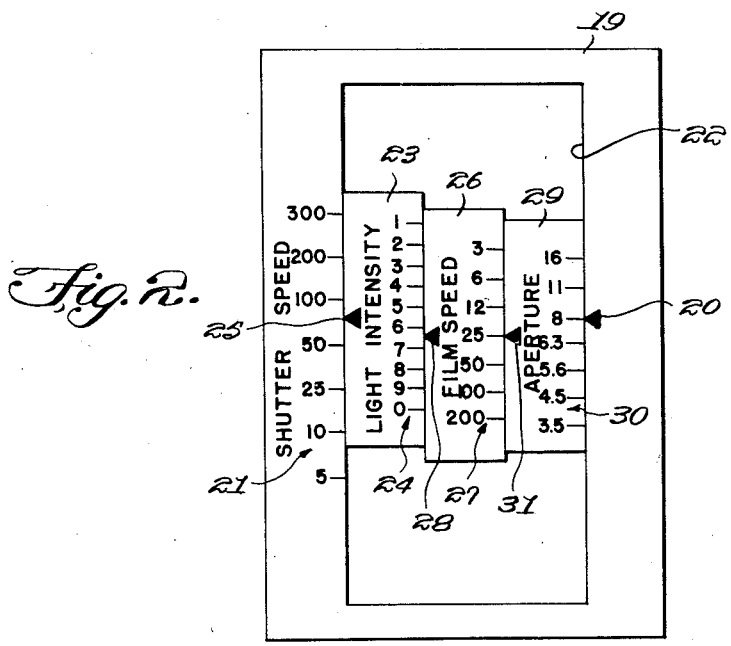
Figure 2 is an elevational view of a modified computing device.

Referring to Figure 2 of the drawings, there is shown a modified photographic computing device which includes a body member 19 that is provided with a recess or channel 22 therein. Arranged on one side of the body member 19 is an indicating mark 20, while arranged on the other side of the body member 19 is a scale 21 which includes calibrated values of camera shutter speed.

Arranged for sliding movement in the recess 22 is a plurality of slides having scales and marks thereon. Thus, there is provided a first slide 23 which has a scale 24 thereon. The scale 24 includes calibrated values of light intensity. The slide 23 is also provided with an indicating mark 25 thereon.

Arranged adjacent the slide 23 and movably mounted in the recess 22 is a slide 26 which is provided with a scale 27 thereon. The scale 27 includes calibrated values of film speed. The slide 26 is also provided with an indicating mark 28 thereon. Finally, movably mounted in the recess 22 and arranged adjacent the slide 26 is a slide 29 which has a scale 30 of calibrated aperture values thereon. The slide 29 is also provided with an indicating marker 31.

The device of Figure 2 can also be used to determine the required value of the lens aperture when the value of the shutter speed, light intensity and film speed are known. Thus, as shown in Figure 2, the slide 23 is moved until its mark 25 coincides with the proper value on the shutter speed scale 21. Then, the slide 26 is moved until its mark 28 coincides with the proper value on the light-intensity scale 24. Next, the slide 29 is adjusted or moved so that its mark 31 coincides with the correct film speed value on the scale 27, and finally, the mark 20 will coincide with the required aperture value as shown on scale 30.

From the foregoing it is apparent that a simple mechanical method has been provided whereby camera aperture can be determined when the film speed, shutter speed and light intensity values are known. Or, if desired, the required value of any of the four variables (shutter speed, film speed, light intensity and lens aperture) can be determined when the values of the other three are known. The computing device is so constructed that movement of one of the scales effects the reading of the next scale, so that a pyramid effect is produced. It is to be understood that the shutter speed value can also be determined by knowing the value of the other three variables. The device can be constructed with either slides, discs or rings. Further, the device shown in Figure 1 is especially adapted to be installed on conventional cameras, and such device can be installed at the factory as the cameras are manufactured.

What is claimed is:

As a new article of manufacture, a photographic computing device comprising a first fixed ring having a scale of calibrated lens aperture values thereon, a second fixed ring arranged in spaced concentric relation about said first ring and having a scale of calibrated shutter speed values, a third ring movably mounted between said first and said second rings, said third ring having a scale of calibrated light intensity values and a scale of calibrated film speed values thereon, a first pointer positioned between said first and third rings, and a second pointer positioned between said second and third rings said pointers being movable between peripheries of said rings, said first pointer coacting with the scales on said first and third rings, and said second pointer cooperating with the scales on said second and third rings.

WILLIAM EUGENE CLARK.

REFERENCES CITED

The following references are of record in the file of this patent:

UNITED STATES PATENTS

| Number | Name | Date |
|---|---|---|
| 432,919 | Will | July 22, 1890 |
| 1,501,920 | Reymond | July 22, 1924 |
| 2,394,835 | Arant | Feb. 12, 1946 |
| 2,421,504 | Hickok | June 31, 1947 |

FOREIGN PATENTS

| Number | Country | Date |
|---|---|---|
| 359,259 | France | Jan. 15, 1906 |